(12) United States Patent
Smith et al.

(10) Patent No.: US 7,547,813 B2
(45) Date of Patent: Jun. 16, 2009

(54) ZSM-5 ADDITIVE

(75) Inventors: Gary M. Smith, Verona, NJ (US); Barry K. Speronello, Montgomery, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 0 days.

(21) Appl. No.: 12/235,963

(22) Filed: Sep. 23, 2008

(65) Prior Publication Data

US 2009/0023971 A1 Jan. 22, 2009

Related U.S. Application Data

(62) Division of application No. 12/074,451, filed on Mar. 4, 2008.

(51) Int. Cl.
*C07C 4/06* (2006.01)
*C10G 11/02* (2006.01)

(52) U.S. Cl. .................. 585/651; 585/653; 208/114; 208/119; 208/120.01; 208/122; 208/125

(58) Field of Classification Search ............ 585/651, 585/653; 208/114, 119, 120.01, 122, 125
See application file for complete search history.

(56) References Cited

U.S. PATENT DOCUMENTS

| 5,190,902 | A | 3/1993 | Demmel |
| 5,231,064 | A | 7/1993 | Absil et al. |
| 5,348,643 | A | 9/1994 | Absil et al. |
| 5,521,133 | A | 5/1996 | Koermer et al. |
| 5,888,378 | A | 3/1999 | Kowalski |
| 6,153,552 | A | 11/2000 | Wachter et al. |
| 2001/0000066 | A1 | 3/2001 | Rodriguez et al. |
| 2003/0047487 | A1 | 3/2003 | Ziebarth et al. |

FOREIGN PATENT DOCUMENTS

| EP | 0933345 | 8/1999 |
| WO | WO0063144 | 10/2000 |

*Primary Examiner*—In Suk Bullock
(74) *Attorney, Agent, or Firm*—Raymond F. Keller

(57) ABSTRACT

A catalyst composition suitable for reacting hydrocarbons such as in fluidized catalytic cracking (FCC) comprises an attrition-resistant particulate having at least 30% of an intermediate pore zeolite, kaolin, a phosphorous compound, and a high density unreactive component. An example of an unreactive component is alpha-alumina. The catalyst can also contain a reactive alumina of high surface area.

7 Claims, No Drawings

ZSM-5 ADDITIVE

RELATED APPLICATIONS

This Application is a divisional of U.S. application Ser. No. 12/074,451, which is a divisional of 11/093,256, now U.S. Pat. No. 7,375,048, which claims priority to U.S. Provisional Application Ser. No. 60/566,452, filed Apr. 24, 2004.

FIELD OF THE INVENTION

This invention relates to improved ZSM-5-containing microspheres produced by spray drying kaolin slurries containing ZSM-5 and calcining the product to form attrition-resistant microspheres.

BACKGROUND OF THE INVENTION

It is well known that kaolin can be formed into particles, alone or with other ingredients such as particles of zeolitic molecular sieve, to form coherent bodies such as microspheres which, when calcined, are further hardened. For example, essentially catalytically inert microspheres adapted to be used in a selective vaporization process or to be blended with active zeolite particles are produced by spray drying a slurry of hydrous (uncalcined) kaolin arid calcining the resulting microspheres. See U.S. Pat. No. 4,781,818, Reagan, et al. Microspheres consisting of calcined kaolin and impregnated with precious metal have been commercially used to promote CO combustion in fluid catalytic cracking units. See U.S. Pat. No. 4,171,286, Dight, et al. In some cases, the promoter particles are preblended with particles containing an active cracking catalyst component (usually zeolite Y). In other applications, the promoter particles are introduced at a suitable level into the regenerator of an FCC unit, separately from the particles of cracking catalyst. Still another use of microspheres composed of calcined kaolin is as a reactant with caustic or sodium silicate solution to form zeolitic cracking catalyst by so-called in-situ routes. See, for example, U.S. Pat. No. 4,493,902, Brown, et al. Many cracking catalysts are prepared by mixing a slurry of previously formed crystals of zeolite Y in appropriate ion-exchange form with silica sol or silica alumina sol and kaolin followed by spray drying. Spray dried microspheres of calcined clay may also be used as a fluidization additive in FCC units.

In carrying out various processes in which an aqueous slurry of kaolin is spray dried, it is conventional to disperse the kaolin in the slurry prior to spray drying in order to permit the formation of high solids slurries that are sufficiently fluid to be spray dried. High solids are preferred for economic reasons. Also, higher solids are conducive to the formation of more strongly bonded particles. To disperse kaolin in water, conventional anionic clay dispersants such as sodium condensed phosphate salts, sodium silicates, soda ash, sodium polyacrylate and mixtures thereof are used. Typically, the pH of concentrated dispersed slurries of kaolin are mildly alkaline to neutral, e.g., 6.0 to 8.0, with pH 7 being optimum.

In many catalytic processes, such as FCC processes, the particles must be attrition-resistant as well as sufficiently porous. Generally, one of these qualities is achieved at the expense of the other. For example, as a particle of given chemical composition is formulated to be highly porous, the hardness usually decreases.

U.S. Pat. No. 5,190,902, Demmel, utilizes the addition of phosphoric acid (or other phosphate compounds) with kaolin in a spray drying process to produce spray dried microspheres which are then calcined. In some formulations zeolite particles are present in the spray dryer feed. The process is carried out in one of two basic ways. In one, the slurry of clay particles is brought to a low pH, e.g., 1.0 to 3.0 before being mixed with a source of phosphorus, followed by spray drying. In the other, the clay slurry is brought to a high pH level (e.g., 14.0 to 10.0) before mixing with phosphate-containing compound. According to the teachings of this patent, use of these pH ranges is necessary for the production of particles with superior attrition resistance. A significant problem with these prior art approaches to producing calcined clay microspheres is that neither pH range is the mildly alkaline to neutral pH range at which concentrated slurries of kaolin are fluid and amenable to commercial spray drying using high solids slurries. Thus, the patentee diluted the original 70% solids slurry to 40% before pH adjustment apparently because of viscosity increases which follow formation of the aluminum phosphate binder.

Similarly, U.S. Pat. Nos. 5,231,064, and 5,348,643, both Absil, et al, describe formation of a cracking catalyst by spray drying a slurry of zeolite with a slurry of clay treated with a phosphorus source at a pH less than 3. Sufficient water is added to bring the combined slurries to a low solids content of ca. 25%.

The use of aluminum phosphates as a binder and hardening agent is well known in the ceramics industry (F. J. Gonzalez and J. W. Halloran, Ceram. Bull 59(7), 727 (1980)). This usually involves addition of alumina to the ceramic mix, followed by treatment with phosphoric acid, curing and firing. Similarly, the hardening of aluminous masses such as those composed of bauxite or kaolin by incorporation of phosphoric acid followed by heat treatment also is known. The product of this treatment is apparently an aluminum phosphate which can act as a binder. An aluminum phosphate formed by interaction of phosphoric acid solution with an aluminum salt solution has been used to bind zeolite and clay in a cracking catalyst composition (U.S. Pat. No. 5,194,412).

Commonly assigned U.S. Pat. No. 5,521,133 discloses forming improved porous microspheres based on spray dried calcined kaolin. The phosphoric acid and kaolin are pumped in separate streams to a static mixer that is adjacent to the atomizer of a spray dryer. The phosphoric acid is injected into a dispersed high solids kaolin slurry and the slurry is virtually instantaneously atomized into droplets in a spray dryer. The term "virtually instantaneously" as used therein refers to a time less than about 20 seconds, preferably less than about 10 seconds. This spray drying technique eliminates undesirable kaolin flocculation and agglomeration prior to the spray dryer.

Kaolin flocculation and agglomeration prior to the spray dryer would result in relatively large clay particle aggregates in the spray dryer feed. The presence of these large aggregates cause poor and uneven packing of the kaolin particles in the microspheres resulting from the spray drying process. Poor and uneven packing of kaolin particles in microspheres leads to insufficient interparticle binding of the particles within the microspheres. This results in poor physical properties including poor attrition resistance.

In contrast, the process of U.S. Pat. No. 5,521,133 provides microspheres which have good kaolin interparticle binding and excellent physical and chemical properties. For example, microspheres produced by the patented process have high attrition resistance. In addition, the microspheres retain higher porosity than microspheres from the same kaolin that are spray dried without phosphoric acid binder and are calcined to the same temperature. This porosity increase coupled with higher attrition resistance is surprising since, generally, an increase in porosity leads to a decrease in attrition resistance. Sufficient porosity is also important because the physical properties of the microspheres should be comparable to those of microspheres containing the active zeolitic catalytic component, i.e., very low or very high densities are undesirable.

Microspheres prepared by using principles of U.S. Pat. No. 5,521,133 have several applications in FCC including: catalytically inert microspheres having a high attrition resistance; active cracking component (by adding zeolite to the clay slurry); microspheres (with or without added components such as MgO) that preferentially react with contaminant vanadium; microspheres for in-situ zeolite growth (see, for example, U.S. Pat. No. 4,493,902, Brown et al); fluidization additive and catalytic support for a carbon monoxide combustion additive.

An FCC additive containing kaolin and 10-25% by weight ZSM-5 has been used to improve gasoline octane and to enhance LPG yields. To further increase LPG while minimizing unit activity loss due to dilution, additives with ZSM-5 levels greater than 25% are required. Unfortunately, in microsphere additives that contain higher than 25% ZSM-5 levels the attrition resistance of the microspheres becomes an issue. An objective of this invention is to make an FCC additive containing at least 40% by weight ZSM-5 with the attrition resistance and with an activity similar or better, compared on the per unit ZSM-5, than the additive containing 25% ZSM-5 or less.

W. R. Grace has a U.S. published patent application, U.S. 2003/0047487, for making additives containing 40-80% ZSM-5 with good attrition resistance. As described therein, the amount of added alumina in the microsphere formulation needs to be less than 10% and the total alumina (added alumina plus alumina in clay and zeolite) is less than 30%. The added alumina has a BET surface area greater than 50 $m^2/g$, preferably greater than 140 $m^2/g$. In their process, clay, zeolite, alumina, and binders such as phosphoric acid and aluminum chlorohydrol are all mixed together to form a uniform slurry prior to spray drying.

The present inventors have discovered that when at least a portion of the microsphere contains particles of high density, low surface area unreactive species, microspheres containing 30% or more ZSM-5 possess high activity per unit ZSM-5 and superior attrition resistance compared to microspheres without such low surface area unreactive species.

SUMMARY OF THE INVENTION

In accordance with this invention, an FCC additive containing at least 30% ZSM-5 and which has good attrition resistance is provided by improving the process as disclosed in commonly assigned U.S. Pat. No. 5,521,133. In accordance with the process of the present invention, a high solids kaolin slurry is mixed with a slurry containing ZSM-5 and a low surface area alumina or similar high density, non-reactive inorganic material. The mixed slurry and phosphoric acid are pumped in separate streams to a static mixture adjacent to the atomizer of a spray dryer. Thus, the phosphoric acid is injected into the dispersed high solids mixed kaolin slurry and the acid-injected slurry is atomized into droplets in a spray dryer. The process provides microspheres which have good kaolin interparticle binding and excellent physical and chemical properties. Moreover, the microspheres can contain at least 30 wt. % ZSM-5 and due to the addition of the unreactive alumina or other high density, unreactive inorganic material, have high attrition resistance.

DETAILED DESCRIPTION OF THE INVENTION

FCC catalysts are often blends of microspheres containing a catalytically active component (microspheres containing zeolite Y) and additives (microspheres composed of highly calcined kaolin with low surface area, with and without zeolite). During the process of fluid cracking, the catalyst components attrit forming fines. While formation of fines generally is considered undesirable, formation of particles less than 2.6 microns (microfines) is considered particularly undesirable as these can lead to operational problems in some FCC units while fines less than 2 microns can be important contributors to stack opacity problems.

Both active and inactive catalyst particles attrit. However, microfine production from insufficiently bound additives may be significantly (2 to 5 times) more severe than from active components.

The attrition resistance of an FCC catalyst or additive can be assessed by a laboratory test (sometimes referred to as a Roller attrition test) described in U.S. Pat. No. 5,082,814, the entire content of which is herein incorporated by reference. The preferred value for an FCC catalyst additive is less than 15% fines generation.

In the practice of this invention, the solids of the kaolin slurry should be kept above 50% (wt.) to insure that the process is economical. Also low solids drying results in an increase in porosity which can impair attrition resistance of the final product. Any dispersant can be used provided the kaolin is fluid (pumpable). Mixtures of soda ash and sodium polyacrylate in various ratios, e.g., 20:80 to 80:20 (weight basis) are preferred. Kaolin solids content and slurry weight are provided so as to yield a hydrous kaolin content in the formed microsphere ranging from about 15 to 50 wt. %, more typically, 25 to 40 wt. %.

The active catalytic zeolite such as ZSM-5 can be incorporated into the kaolin slurry by mixing therewith an aqueous slurry of the zeolite catalyst. While ZSM-5 is preferred, other known shape-selective zeolites useful for FCC are known and are characterized by an intermediate pore size (e.g., pore size of from about 4 to about 7 angstroms). Besides ZSM-5, ZSM-11 can also be used. Methods for preparing the intermediate pore ZSM zeolite catalysts are well known in the art. The ZSM-5 catalyst is preferably prepared in an aqueous slurry containing from 10-40% by weight solids. Sufficient ZSM-5 is provided to yield a microsphere that contains at least 30 wt. % of the catalytic active component. Amounts of at least 40 wt. % are preferred.

Prior to mixing the ZSM-5 slurry with the kaolin slurry, it is preferred to add alumina or other inorganic components into the catalytic slurry. The alumina or like inorganic components can be characterized as inactive components and have a low BET surface area and high density. Typically, the alumina or inorganic component which is added to the catalytic slurry will have a BET surface area of less than 50 $m^2/g$ and a density greater than 2.8 g/cc. Preferably the high density unreactive component will have a BET surface area less than 25 $m^2/g$ and a density greater than 3.0 g/cc. Most preferably the high density unreactive component will have a BET surface area less than 25 $m^2/g$ and a density greater than 3.5 g/cc. By density it is meant the solid or crystal density of the solid material excluding pores having a diameter of greater than 20 angstroms. Examples of the inactive components include alpha-alumina and inorganic oxides or silicates such as zirconia, titania, zirconium silicate, mullite, metal carbides such as silicon carbide, metal nitrides such as silicon nitride, and other inorganic materials which have the desired low surface area and high density. Typically these materials can be added in solid form into the ZSM-5-containing catalytic slurry. Levels of the inactive component are such as to provide a final level of unreactive alumina or other unreactive component in the microsphere in amounts ranging from 3-25 weight %, more typically from about 4-10% by weight.

Optionally added to the microspheres of the present invention can be reactive alumina species. These reactive alumina species are typically added to the ZSM-5 catalytic slurry and are characterized as having a total surface area (BET) of greater than 50 m$^2$/g. Preferably, reactive aluminas of much higher surface areas of from about 140 to 400 m$^2$/g can be used. These reactive aluminas can typically include boehmite including dispersable boehmite (sometimes referred to as pseudoboehmite), gibbsite, and other transitional aluminas. Particularly useful is a dispersable boehmite which forms fine particles in acid such as formic acid. Thus, the dispersable boehmite can be first dispersed in an aqueous solution of acid and then added to the ZSM-5 catalyst slurry. Levels of the reactive high surface area alumina which can be added include levels that will provide from about 2-20 wt. % of the reactive alumina in the final microsphere. Typical amounts of the reactive alumina will range from 4-8 wt. %. The total weight of alumina, whether active or inactive, which can be added to and form part of the microsphere of this invention can range from at least 5 wt. % and typically will range from about 8-25 wt. %. A total alumina content, not including the alumina of the kaolin or the zeolite, in other words the amount of alumina in the form of added unreactive and reactive alumina, in amounts of greater than 10%, have been found most useful, including amounts of from about 12-20 wt. %.

The phosphoric acid is preferably added as a concentrated solution; thus, minimal dilution of the dispersed kaolin slurry takes place when acid is injected. Thus, the phosphoric acid concentration can be from 5 to 80% by weight; 50 to 80% concentrations are preferred. The amount of P added can vary widely depending on the particle size of the kaolin and the hardness that is desired. For cost reasons, it is generally preferred to minimize the phosphoric acid content consistent with the desired physical and chemical properties. Satisfactory results have been attained using sufficient phosphoric acid to produce products analyzing 3-15% $P_2O_5$, expressed on a volatile free weight basis. Microsphere products containing 7-15% $P_2O_5$ are typical.

Calcination can be carried out in a standard laboratory high temperature oven. Alternatively, the calcination can be carried out on a large scale in a rotary kiln or other commercial scale calciner.

The temperature to which the material is calcined depends on the desired levels of attrition resistance and porosity which, in turn, will depend on the intended end use, the particle size of the kaolin and the % phosphate binder employed. For example, if the kaolin is a fine clay (95%<2 microns) and the binder level is ca. 7% (as $P_2O_5$), a calcination temperature of at least about 1800° F. is required. For a coarser clay (80%<2 microns) and the same level of binder, a temperature of about 2100° F. is required to achieve the same level of attrition resistance. Overall, a temperature range from about 1200°-2200° F. is appropriate, with a range of 1500°-2100° F. preferred. Time at temperature is important only insofar as sufficient time must be provided for the entire mass being calcined to reach the desired calcination temperature. Thus, adequate heating can be accomplished in relatively short times provided samples are small. Conversely, if the temperature selected is too low, extending the calcination time has no beneficial effect.

Kaolin particle size distribution is an important consideration in the preparation of suitable microspheres. If the kaolin particle size is too large compared to the microsphere diameter, then particle packing within the microspheres will be non-uniform and interparticle binding among kaolin particles will be insufficient to achieve the desired physical properties such as attrition resistance. Using a kaolin consisting predominantly of fine particles will give more uniform packing of the particles within the microsphere and better opportunity for interparticle binding. The types of kaolin used in the examples are listed below along with a conventional measure of fineness, the wt %<2 microns.

| Trade Name | Wt % <2 microns |
|---|---|
| ASP ® 600 | 80 |
| ASP ® 400 | 35 |
| ASP ® 200 | 90 |
| ASP ® 072 | 98 |

®Registered Trademark of Engelhard Corp., Iselin, NJ.

The additive of this invention is suitable for any chemical reaction involving a hydrocarbon feed requiring catalyst to facilitate the reaction. Such reactions include hydrocarbon conversion processes involving molecular weight reduction of a hydrocarbon, e.g., cracking. The invention can also be employed in isomerization, dimerization, polymerization, hydration and aromatization. The conditions of such processes are known in the art. See U.S. Pat. No. 4,418,235 incorporated herein by reference. Other applicable processes include upgradings of reformate, transalkylation of aromatic hydrocarbons, alkylation of aromatics and reduction in the pour point of fuel oils. For the purposes of this invention, "hydrocarbon feedstock" not only includes organic compounds containing carbon and hydrogen atoms, but also includes hydrocarbons comprising oxygen, nitrogen and sulfur heteroatoms. The feedstocks can be those having a wide range of boiling temperatures, e.g., naphtha, distillate, vacuum gas oil and residual oil. Such feedstocks also include those for making heterocyclic compounds such as pyridine.

The invention is particularly suitable for fluidized processes, e.g., in which catalyst attrition is a factor. The invention is especially suitable for fluidized catalytic cracking of a hydrocarbon feed to a mixture of products comprising gasoline, alkylate, potential alkylate, and lower olefins, in the presence of conventional cracking catalyst under catalytic cracking conditions.

Typical hydrocarbons, i.e., feedstock, to such processes may include in whole or in part, a gas oil (e.g., light, medium, or heavy gas oil) having an initial boiling point above about 204° C., a 50% point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure.

Resids or deeper cut gas oils having an end point of up to about 700° C., even with high metals contents, can also be cracked using the invention.

Catalytic cracking units are generally operated at temperatures from about 400° C. to about 650° C., usually from about 450° C. to about 600° C., and under reduced, atmospheric, or superatmospheric pressure, usually from about atmospheric to about 5 atmospheres.

An FCC catalyst (primary or additive) is added to a FCC process as a powder (20-200 microns) and generally is suspended in the feed and propelled upward in a reaction zone. A relatively heavy hydrocarbon feedstock, e.g., a gas oil, is admixed with a catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. After stripping entrained hydrocarbons from the spent catalyst, the catalyst is conveyed to a catalyst regenerator unit. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed for further processing and separation to gasoline and light olefins, with $C_3$ and $C_4$ product olefins being directed to a petrochemical unit or to an alkylation unit to produce a high octane gasoline by the reaction of an isoparaffin (usually iso-butane) with one or more of the low molecular weight olefins (usually propylene and butylene). Ethylene would be recovered in a similar fashion and processed to additional petrochemical units.

The FCC conversion conditions include a riser top temperature of from about 500° C. to about 595° C., preferably from about 5200° C. to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

The catalyst of this invention is suitable as a catalyst alone, or as an additive to cracking processes which employ conventional large-pore molecular sieve component. The same applies for processes other than cracking processes. When used as an additive the catalyst of this invention is typically present in an amount between about 0.1% by weight and 30% by weight of the total catalyst inventory, and more typically in an amount between about 1% by weight and 15% by weight of the total. Cracking catalysts are large pore materials having pore openings of greater than about 7 Angstroms in effective diameter. Conventional large-pore molecular sieve include zeolite X (U.S. Pat. No. 2,882,442); REX; zeolite Y (U.S. Pat. No. 3,130,007); Ultrastable Y (USY) (U.S. Pat. No. 3,449,070); Rare Earth exchanged Y (REY) (U.S. Pat. No. 4,415,438); Rare Earth exchanged USY (REUSY); Dealuminated Y (DeAl Y) (U.S. Pat. Nos. 3,442,792 and 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. ZSM-20 (U.S. Pat. No. 3,972,983); zeolite Beta (U.S. Pat. No. 3,308,069); zeolite L (U.S. Pat. Nos. 3,216,789 and 4,701,315); and naturally occurring zeolites such as faujasite, mordenite and the like may also be used (with all patents above in parentheses incorporated herein by reference). These materials may be subjected to conventional treatments, such as impregnation or ion exchange with rare earths to increase stability. In current commercial practice most cracking catalysts contain these large-pore molecular sieves. The preferred molecular sieve of those listed above is a zeolite Y, more preferably an REY, USY or REUSY. NapthaMax® catalyst from Engelhard Corp. is a particularly suitable large pore catalyst. Methods for making these zeolites are known in the art.

Other large-pore crystalline molecular sieves include pillared silicates and/or clays; aluminophosphates, e.g., $AlPO_{4-5}$, $AlPO_{4-8}$, VPI-5; silicoaluminophosphates, e.g., SAPO-5, SAPO-37, SAPO-40, MCM-9; and other metal aluminophosphates. Mesoporous crystalline material for use as the molecular sieve includes MCM-41. These are variously described in U.S. Pat. Nos. 4,310,440; 4,440,871; 4,554,143; 4,567,029; 4,666,875; 4,742,033; 4,880,611; 4,859,314; 4,791,083; 5,102,643; and 5,098,684, each incorporated herein by reference.

The large-pore molecular sieve catalyst component may also include phosphorus or a phosphorus compound for any of the functions generally attributed thereto, such as, for example, attrition resistance, stability, metals passivation, and coke make reduction.

EXAMPLE 1

Preparation of a ZSM-5 additive in accordance with the present invention was as follows:

ZSM-5 having a $SiO_2:Al_2O_3$ of 26 was added to deionized water to obtain a 25% (by weight) solids slurry and milled to a particle size of 90%<3 microns. The resultant slurry solids content after milling via a Premier Mill was 17%.

Another slurry was prepared by adding Sasol Catapal™ B brand boehmite type alumina to deionized water to obtain 20 wt. % solids. The alumina was dispersed by adjusting slurry pH to 4.0 using nitric acid while mixing. Nine hundred ninety three (993) grams of the resultant (20.6% solids) Catapal™ B slurry was added to 5.63 kg of 17% ZSM-5 slurry and mixed.

To the resultant ZSM-5/alumina slurry, 193 grams of Nabaltec Nabalox™ 313 alpha alumina powder was added while mixing.

Engelhard's ASP®-200 kaolin was slurried in water to 50% solids and dispersed with TSPP. A portion (1743 grams) of the kaolin slurry was added to the mixed ZSM-5/alumina slurry using a high shear mixer.

The ZSM-5/alumina/kaolin slurry was spray dried into microspheres using a pressure nozzle spray dryer with the metered addition of 28% orthophosphoric acid solution via an in-line mixer at an acid/slurry ratio of 0.169 to target 12% $P_2O_5$ on the final product.

The spray dried product was muffle calcined at 1250° F. for 30 minutes at a bed depth of 1.5 to 2 inches. The composition of the microsphere is shown in Table 1 below.

COMPARATIVE EXAMPLE 1

Preparation

ZSM-5 as used above in Example 1 and having a $SiO_2$:$Al_2O_3$ of 26 was added to deionized water to obtain a 25% (by weight) solids slurry and milled to a particle size of 90%<3 microns. The resultant slurry solids content after milling via a Premiere Mill was 19.9%.

Another slurry was prepared by adding Sasol Catapal™ B brand boehmite type alumina to deionized water to obtain 22 wt. % solids. The alumina was dispersed by adjusting slurry pH to 4.0 using nitric acid while mixing. Nine hundred twenty (920) grams of the resultant (22.3% solids) Catapal™ B slurry was added to 4.86 kg of 19.9% ZSM-5 slurry and mixed.

Engelhard's ASP®-200 kaolin was slurried in water to 54% solids and dispersed with TSPP. A portion (2043 grams) of the kaolin slurry was added to the mixed ZSM-5/alumina slurry using a high shear mixer.

The ZSM-5/alumina/kaolin slurry was spray dried into microspheres using a pressure nozzle spray dryer with the metered addition of 28% orthophosphoric acid solution via an in-line mixer at an acid/slurry ratio of 0.162 to target 12% $P_2O_5$ on the final product.

The spray dried product was muffle calcined at 1250° F. for 30 minutes at a bed depth of 1.5 to 2 inches. The composition of the microsphere is shown in Table 1 below.

COMPARATIVE EXAMPLE 2

A commercially available, Engelhard FCC catalyst additive containing 25% by weight ZSM-5 was provided. The composition of the commercial microsphere is shown in Table 1 below.

TABLE 1

|  | Example (1) | Comparative Example (1) | Comparative Example (2) |
| --- | --- | --- | --- |
| ZSM-5% | 40 | 40 | 25 |
| $P_2O_5$ | 11 | 11 | 14.5 |
| Reactive $Al_2O_3$ | 6.5 | 6.5 | 10 |
| Alpha $Al_2O_3$ | 8.5 | 0 | 0 |
| Hydrous Kaolin | 34 | 42.5 | 50.5 |

EXAMPLE 2

Chemical properties of the spray-dried ZSM-5 additives described above and the activity thereof for propylene formation are shown in Table 2.

TABLE 2

|  | Example (1) | Comparative Example (1) | Comparative Example (2) |
| --- | --- | --- | --- |
| $Al_2O_3$ % | 32 | 28.5 | 33.5 |
| $SiO_2$ % | 61 | 61 | 48.2 |
| $P_2O_5$ % | 11 | 9 | 15 |
| Roller Attrition | 15 | 25 | 15 |
| Propylene Delta | 2.1 | 2.0 | 1.4 |

It can be seen the microsphere of Example 1 containing alpha-alumina had improved roller attrition over Comparative Example 1 without alpha-alumina, and had equivalent attrition resistance as Comparative Example 2, although a significantly higher level of ZSM-5 was provided.

Propylene yield was measured on an ACE fluid-bed hydrocarbon cracking unit using a gas-oil feed. The catalyst used was comprised of 90% FCC catalyst (containing zeolite Y), 3% additive of Example 1 and Comparative Example 1, or 4.8% of additive of Comparative Example 2 (to achieve equal ZSM-5 content in the blend relative to the other examples), and balance with an inert kaolin microsphere. All catalyst components and additives were steamed at 1500° F. for 4 hours/100% steam prior to testing. Baseline propylene (without additive) yield at 75 wt. % conversion provided a 5.0 wt. % propylene yield. Propylene Delta was calculated by subtracting the baseline propylene yield (5%) from the propylene yields of the catalysts of the examples.

What is claimed is:

1. A process for chemically and catalytically reacting a hydrocarbon feed comprising contacting the feed at catalytic reactive conditions with a catalyst comprising (a) at least about 30% by weight of an intermediate pore zeolite, (b) about 3-15% by weight phosphorus, measured as $P_2O_5$, (c) about 15 to 45% by weight kaolin, and (d) an unreactive metal-containing component other than kaolin with a BET surface area of less than 50 $m^2/g$.

2. A process according to claim 1 wherein the catalyst comprises at least about 40% by weight ZSM-5.

3. A process according to claim 1 wherein said unreactive component (d) is alpha-alumina.

4. A process according to claim 3 wherein said catalyst further includes (e) a reactive alumina, said catalyst comprising about 3 to 15% by weight unreactive alumina and 2 to 20 wt. % of reactive alumina.

5. A process according to claim 4 wherein the added alumina (d) and (e) is present in said catalyst in an amount of greater than 10 wt. %.

6. A process according to claim 1 further comprising recovering ethylene and/or propylene from said process.

7. A process according to claim 1 wherein the process is fluidized catalytic cracking of hydrocarbons.

* * * * *